J. E. WORSWICK.

CAR WHEEL BRAKE SHOE AND DRESSER.

No. 11,527. Reissued Mar. 31, 1896.

Witnesses

C. W. Miles.

Oliver B. T. Kaiser.

Inventor

James E. Worswick

By Woods & Boyd

Attorneys

UNITED STATES PATENT OFFICE.

JAMES E. WORSWICK, OF AMERICUS, GEORGIA.

CAR-WHEEL BRAKE-SHOE AND DRESSER.

SPECIFICATION forming part of Reissued Letters Patent No. 11,527, dated March 31, 1896.

Original No. 528,198, dated October 30, 1894. Application for reissue filed December 18, 1895. Serial No. 572,712.

*To all whom it may concern:*

Be it known that I, JAMES EDWARD WORSWICK, residing at Americus, in the county of Sumter and State of Georgia, have invented a new and Improved Car-Wheel Brake-Shoe and Dresser, of which the following is a specification.

My invention relates more particularly to a combined brake-shoe and dresser for use on locomotive and car wheels, and it primarily has for its object to provide a shoe of this kind of a simple but inexpensive construction, and in which a perfect cutting-surface will at all times be maintained in the face of the shoe, so as to keep that part of the wheel or flange which does not come in contact with the rail to its original shape.

Heretofore combined brake-shoes and wheel-dressers have been provided having their body portions formed of a soft metal, having integral or detached cutting or bearing portions of a harder material held flush with the inner face of the soft body, which intended cutting portions become clogged. Such construction of brake-shoe has been found very objectionable. In fact, first, no channel-ways or depressions are provided for disposing of the refuse or grindings, which thereby clog the intended cutting-surfaces, which then become useless for the purposes intended; secondly, the refuse particles become fused on the face of the shoe and impair the efficiency of the brake; thirdly, as the cutting portions are flush with the face of the shoe no provision is made for automatically maintaining a cutting edge on the harder or cutting material as the face of the shoe is worn away. Furthermore, as the bearing-faces of the intended cutter portions are arranged flush with other bearing portions of the shoe, it is therefore apparent it does not accomplish the object in view—that of dressing wheels. These objections I overcome by the use of my invention, which consists in the peculiar and novel features of construction hereinafter first described in detail, and then particularly pointed out in the appended claims, reference being had to the accompanying drawings, in which—

Figure 1:
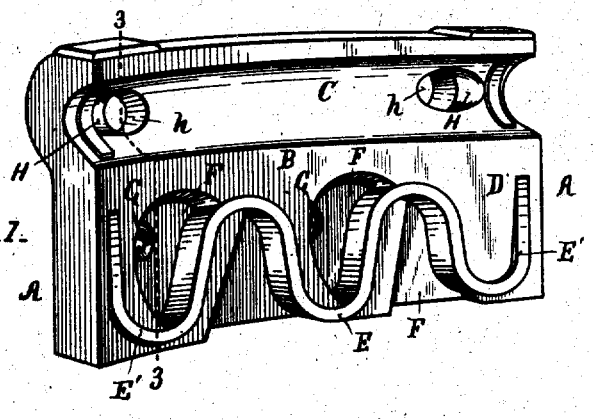
Figure 2:
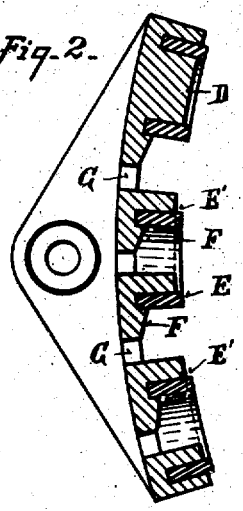
Figure 3:
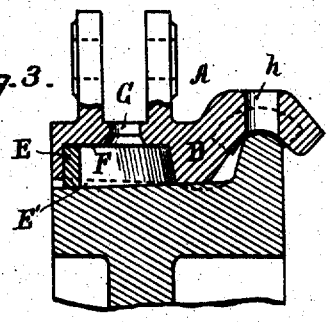
Figure 5:
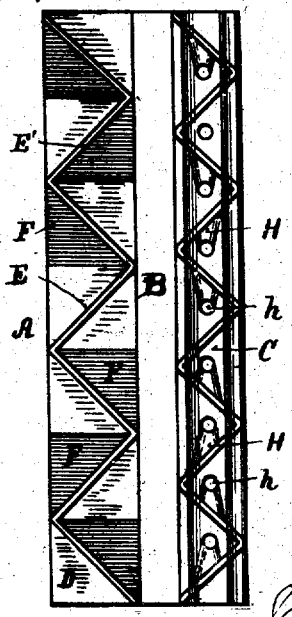
Figure 4:
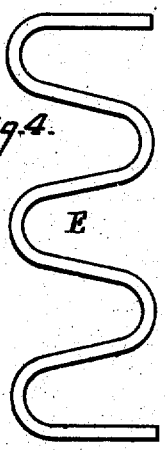

Figure 1 is a perspective view of my improved brake-shoe and dresser. Fig. 2 is a longitudinal section thereof. Fig. 3 is a transverse section of the same on the line 3 3, Fig. 2. Fig. 4 is a view of the sinuous cutter plate or member. Fig. 5 is a plan view of the inner or bearing face of the shoe with an angular cutter plate or member.

Referring to the accompanying drawings, A indicates the shoe, which has the usual tread-bearing and flange-bearing portions B and C. This shoe is made of cast-iron and steel, or of any two metals of different degrees of hardness, the main or body portion D being of the softer metal. In the construction shown the harder or steel portion E is sinuous in shape and preferably concavo-convex in form, or it may be formed of a series of angles reversed, as shown in Fig. 5, and extends continuously from end to end of the inside or contact face of the shoe or main portion, and such portion E in the process of manufacture is placed in the mold or sand and has the iron or softer metal cast around it.

It will be noticed by reference to Fig. 3 that the portion E has its lower edge, which forms, owing to its sinuosity, a series of concavo-convex transverse bearing or cutter members E′, projected below the face of the main portion, the degree of cutting-surface diminishing from the center of cutter to the contact portion of the tread of the wheel, for the purpose presently explained.

At alternate sides of the reverse curves of the lower end of the sinuous portion E depressions F are formed in the softer metal, which have outlets G, which extend through to the outer edge of the shoe and form outlets for the escape of the cuttings or refuse matter, as will hereinafter more fully appear.

The ends of the flange-portion bearing-faces have transverse cutter members of hard material, at the inner faces of which are depressions or grooved portions H, which also have outlets *h*, as shown. It will be observed that the cutting portion projects beyond the face of the softer metal through the length of the shoe, and that adjacent to and inside the cutting members are depressions F, having one or more outlet-orifices pierced through the shoe inside the cutting members for the discharge of the cutting-dust, and that the elevation of the cutting members above the face of the softer material facilitates the removal of the dust. The space thus formed is highly advantageous to the operation of the brake-shoe.

It will be observed that in the grooved portions of the shoe the depressions between the cutting members have outlets *h* and that this form of construction is material in the operation of the brake-shoe and in the discharge of the dust.

Employing a continuous piece of material harder than the body, extended longitudinally of the shoe, greatly strengthens the shoe, and by making such piece sinuous provides for a series of transverse cutting edges, the curvatures of which act as supports for one another and strengthen each other and thereby effectually prevent any of the cutting-surfaces becoming displaced.

By providing depressions on alternate sides of the reverse curves of the cutter members such members will dress the wheel and flange regardless of the direction the wheel is traveling, such construction also providing for an automatic maintenance of the cutting edges as the shoe becomes worn, such depressions also serving as pockets to collect the cuttings or refuse, which will pass out through the openings before referred to.

It is obvious that the sinuosity of the cutter results in decreasing the cutting-surface of cutter as it approaches that part of tread which comes in contact with rail or that part of face of wheel which wears fastest; also cutting-surface increases at point where there is the least wear.

The depressions in the face of the shoe, while apparently reducing the frictional surface, do not practically lessen its efficiency as a brake-shoe in consequence of the increased resistance of the steel or hard-metal cutting-surfaces.

Having thus described my invention, what I claim, and desire to secure by Letters Patent, is—

1. A car-wheel brake-shoe and dresser, having a body formed of a soft metal and having transverse cutting or dressing faces of a harder material, which are projected beyond the bearing-face of the soft portion as specified.

2. A car-wheel brake-shoe and dresser having a body formed of soft metal and transverse cutting-faces of hard material which project beyond the face of the soft metal, and one or more outlet-orifices pierced through the shoe inside of the cutting members and contiguous thereto, substantially as specified.

3. A car-wheel brake-shoe, having a body formed of soft metal and having transverse cutting-sections of harder metal inserted in and projecting beyond the face of the soft metal, and having depressions adjacent to said cutting-sections, terminating in outlet-orifices pierced through the shoe for the discharge of the dust-cuttings, substantially as specified.

4. A car-wheel brake-shoe and dresser having a body formed of soft material, and a portion thereof curving over and grooved to embrace the flange of the wheel, said groove having transverse cutters formed of hard material projecting beyond the face of the groove and one or more outlet-orifices pierced through said grooved sections for the discharge of the cutting-dust, substantially as specified.

5. In a car-wheel brake-shoe and dresser, in combination, the main or body portion formed of a soft metal, cutting portions formed of a harder metal cast with the soft metal, and having their inner edges projected beyond the inner face of the soft metal, as and for the purpose described.

6. A car-wheel brake-shoe and dresser, having transverse cutter members, projected beyond the inner face outside of its tread portion, the degree of cutting-surface diminishing as it approaches that part of tread which receives the most wear, and increasing at a point where there is the least wear, as and for the purpose set forth.

7. A car-wheel brake-shoe and dresser, consisting of a body portion formed of two metals of different degrees of hardness, the harder one being sinuous and extending from end to end of the softer metal with its reverse edges projected above depressions to form transverse cutting members, as and for the purpose specified.

8. A car-wheel brake-shoe and dresser, formed of a main or body portion of a soft metal, and an integral continuous portion formed of a harder material projected transversely beyond the contact-face of the body at intervals, substantially as shown and described.

9. A car-wheel brake-shoe and dresser, composed of a body formed of a main portion of soft metal, and a portion of harder metal projected beyond the bearing-face of the soft body, the spaces in such soft body between the hard-metal portions having pockets or depressions, terminating at their outer ends in discharge-openings, all arranged substantially as shown and for the purposes described.

10. A car-wheel brake-shoe, comprising a main or body portion of a soft metal, such as iron, and a harder portion, such as steel, formed of a sinuous or angular member extending continuously from end to end of the shoe, whereby to form transverse reversely-curved cutting members, said soft body having depressions on alternate sides of the reverse curves of the cutting portions, substantially as and for the purposes described.

11. A car-wheel brake-shoe and dresser, formed of a body of soft metal having projecting cutting-faces formed of a continuous member of harder metal cast with the soft body, sinuous or angular in shape, extending from end to end of the soft body, and having its bearing-faces concaved to fit the curvature of any wheel to which it is to be applied, substantially as shown and for the purposes specified.

In testimony whereof I hereunto put my hand.

J. E. WORSWICK.

Witnesses:
W. H. MACALISTER,
T. W. CALLAWAY.